(12) United States Patent
Lin

(10) Patent No.: US 10,785,321 B2
(45) Date of Patent: Sep. 22, 2020

(54) SERVICE FUNCTION CHAIN (SFC) BASED MULTI-TENANCY PROCESSING METHOD

(71) Applicant: NANNING FUGUI PRECISION INDUSTRIAL CO., LTD., Nanning (CN)

(72) Inventor: Kuan-Hung Lin, New Taipei (TW)

(73) Assignee: NANNING PUGUI PRECISION INDUSTRIAL CO., LTD., Nanning (CN)

(*) Notice: Subject to any disclaimer, the term of this patent is extended or adjusted under 35 U.S.C. 154(b) by 74 days.

(21) Appl. No.: 16/195,010

(22) Filed: Nov. 19, 2018

(65) Prior Publication Data

US 2020/0162562 A1    May 21, 2020

(51) Int. Cl.
| | | |
|---|---|---|
| G06F 15/173 | (2006.01) | |
| H04L 29/08 | (2006.01) | |
| H04L 12/46 | (2006.01) | |
| H04L 12/24 | (2006.01) | |
| H04L 12/26 | (2006.01) | |
| H04L 12/725 | (2013.01) | |
| G06F 9/455 | (2018.01) | |

(52) U.S. Cl.
CPC .......... *H04L 67/16* (2013.01); *H04L 12/4633* (2013.01); *H04L 41/16* (2013.01); *H04L 43/04* (2013.01); *H04L 45/308* (2013.01); *G06F 9/455* (2013.01)

(58) Field of Classification Search
CPC ......... H04L 67/16; H04L 67/32; H04L 69/22; H04L 45/64
See application file for complete search history.

(56) References Cited

U.S. PATENT DOCUMENTS

| | | | |
|---|---|---|---|
| 2015/0139238 A1* | 5/2015 | Pourzandi | H04L 45/64 370/392 |
| 2017/0195292 A1* | 7/2017 | Pham | H04L 63/0263 |
| 2018/0091420 A1* | 3/2018 | Drake | H04L 45/00 |
| 2018/0255152 A1* | 9/2018 | Jeuk | H04L 67/28 |

* cited by examiner

Primary Examiner — Yves Dalencourt
(74) Attorney, Agent, or Firm — ScienBiziP, P.C.

(57) ABSTRACT

A service function chain (SFC) based multi-tenancy processing method. The disclosed method allows isolation between SFC enabled domains while facilitating aggregation of tenant related data sets from SFC packet flows of various service function paths (SFPs) through cross domain bridges (CDB) in SFC enabled domains, delegators in a demilitarized zone, and a tenant aware service function (TASF). A CDB serves as a service function (SF) in a SFP and also serves as a classifier forwarding SFC packets to the demilitarized zone. A CDB gateway serves as a classifier in a delegator receives the SFC packets from the CDB. The TASF collects information from the SFC packets.

13 Claims, 5 Drawing Sheets

SERVICE FUNCTION CHAIN (SFC) BASED MULTI-TENANCY PROCESSING METHOD

BACKGROUND

1. Technical Field

The disclosure relates to computer techniques, and more particularly to service function chain (SFC) based cross domain data aggregation method.

2. Description of Related Art

In the field of network function virtualization (NFV), service function chains (SFCs) for different tenants are often isolated by overlay network protocols such as virtual local area network (VLAN), virtual extensible local area network (VXLAN), and generic routing encapsulation (GRE). Data traffic from one SFC is prevented from flowing into another SFC to ensure such SFC isolation.

Artificial intelligence (AI) related network functions, such as deep learning and big data analysis, on the other hand, need massive volumes of training data. Some AI applications may require training data to be collected from multiple tenants, that is, from multiple SFCs to optimize the AI functions. Collecting data from multiple SFCs, however, violates SFC isolation.

DETAILED DESCRIPTION

The present disclosure provides a service function chain (SFC) based multi-tenancy processing method.

Figure 1:
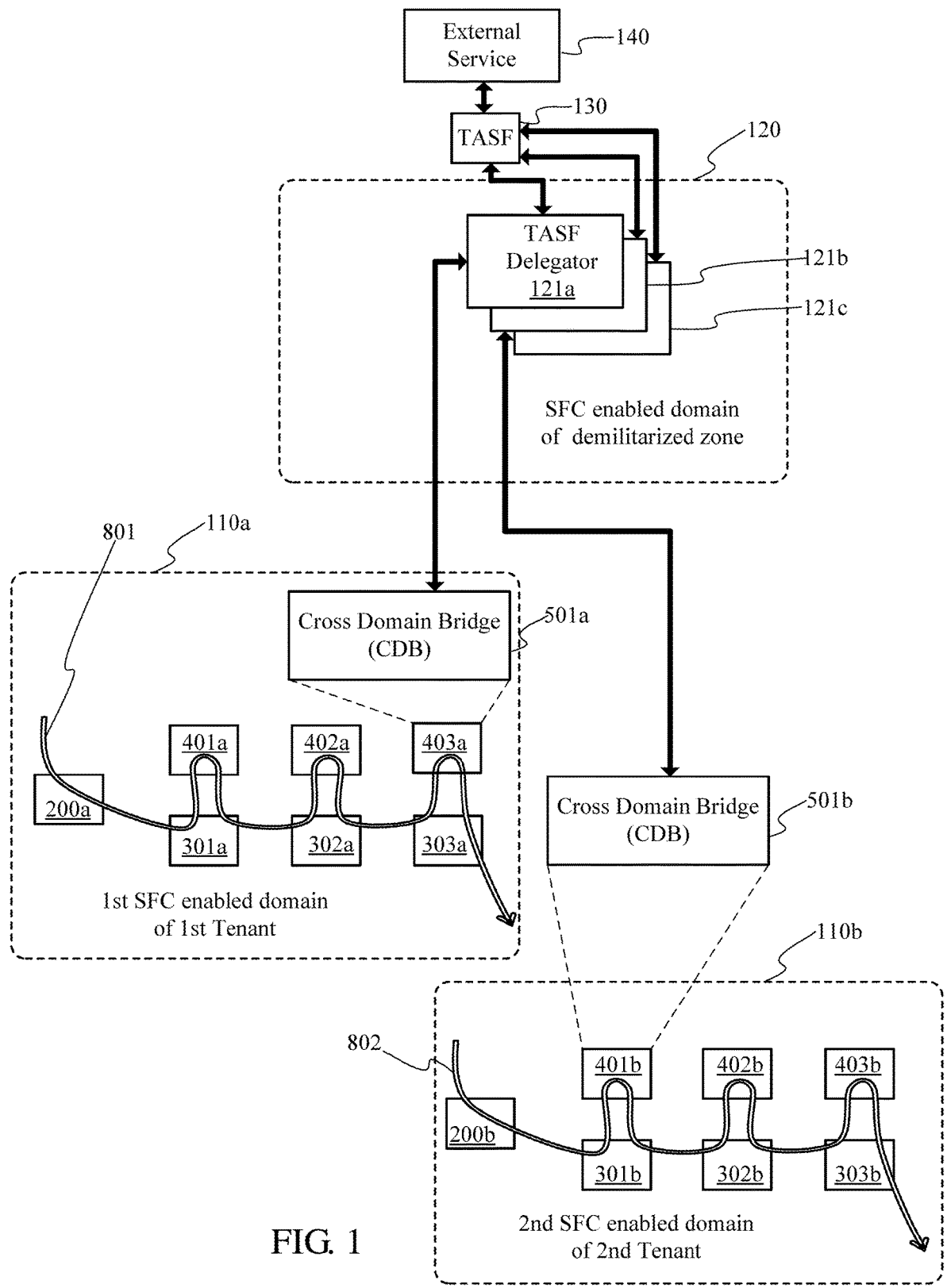
FIG. 1 is a block diagram illustrating an exemplary embodiment of a system of the present disclosure.

With reference to FIG. 1, a SFC enabled domain 110a of a first tenant includes a SFC classifier 200a, service function forwarders (SFFs) 301a-303a, and service functions (SFs) 401a-403a. A SFC enabled domain 110b of a second tenant includes a SFC classifier 200b, SFFs 301b-303b, and SFs 401b-403b.

The SFC classifier 200a may initiate a service function path (SFP) as an instance of a SFC of the domain 110a. A SFP is a mechanism used by service chaining to express the result of applying more granular policy and operational constraints to the abstract requirements of a SFC. The SFC enabled domain 110a includes a SFP including an ordered set of SFs 401a, 402a, and 403a. —A classifier is an element that performs classification function. An exemplary definition of classification function may be referred to in Internet Engineering Task Force (IETF) RFC 7665. The SFC classifier 200a is connected to SFFs 301a-303a. The SFF 301a is connected to SF 401a. The SFF 302a is connected to SF 402a. The SFF 303a is connected to SF 403a. The SF 403a includes a cross domain bridge (CDB) 501a. A flow 801 of SFC packets travels through the SFP, and the packets in the flow 801 are orderly processed by the classifier 200a, SFF 301a, SF 401a, SFF 301a, SFF 302a, SF 402a, SFF 302a, SFF 303a, SF 403a, and SFF 303a. Entities in FIG. 1 may include physical entities or virtual entities providing specific functions. For example, an exemplary embodiment of the CDB 501a may be a cross domain bridge device. Alternatively, an exemplary embodiment of the CDB 501a may be a cross domain bridge function executable in an SF.

The SFC enabled domain 110b includes a SFP including an ordered set of SFs 401b, 402b, and 403b. The SFC classifier 200b is connected to SFFs 301b-303b. The SFF 301b is connected to SF 401b. The SFF 302b is connected to the SF 402b. The SFF 303b is connected to SF 403b. The SF 401b includes a cross domain bridge (CDB) 501b. A flow 802 of SFC packets passes through the SFP, and the packets in the flow 802 are orderly processed by the classifier 200b, SFF 301b, SF 401b, SFF 301b, SFF 302b, SF 402b, SFF 302b, SFF 303b, SF 403b, and SFF 303b.

A SFC enabled domain 120 is referred to as a demilitarized zone or a broker domain and includes a plurality of delegators including tenant-aware service function delegators 121a, 121b, and 121c. The delegator 121a interacts with domain 110a through CDB 501a. The delegator 121b interacts with domain 110b through CDB 501b. A delegator 121c may interact with another SFC enabled domain through another instance of a CDB. Each of the delegators 121a, 121b, and 121c may interact with an external service 140, such as a malware protection function, big data analysis function, artificial intelligence (AI) function, or others, through a tenant aware service function (TASF) 130. The big data analysis function and the artificial intelligence (AI) function are examples of massive data processing functions which consume massive data sets. The delegators do not directly communicate with each other, thus delegator isolation and SFC isolation are sustained. Each of the delegators connects a SFC enabled domain, such as an SFP, to the TASF.

Note that arrangement of entities in FIG. 1 is illustrated for better understanding of the present disclosure and do not limit the scope of the present disclosure. For example, the domain 120 may include an arbitrary number of delegators operable to interact with SFC enable domains. Each of the SFPs in domains 110a and 110b may include an arbitrary number of SFs. An SFF may be connected to one SF or a plurality of SFs. A cross domain bridge may be located in another SF.

Figure 2:
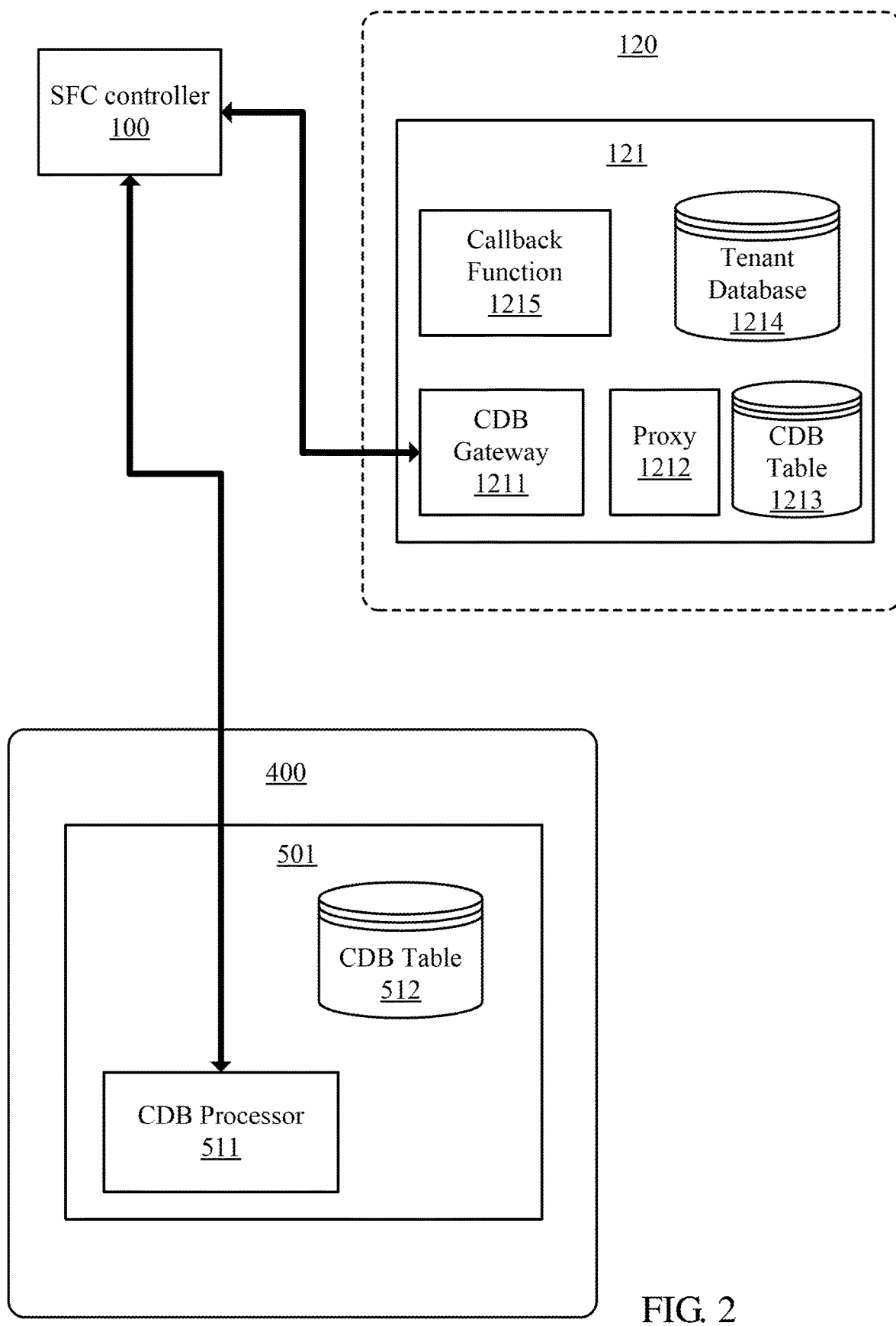
FIG. 2 is a block diagram illustrating a cross domain bridge and a tenant aware service function delegator.

With reference to FIG. 2, the domain 120 includes a delegator 121. Each of the delegators 121a, 121b, and 121c may be an exemplary embodiment of the delegator 121. The delegator 121 includes a CDB gateway 1211, a proxy 1212, a CDB table 1213, a tenant database 1214, and a callback function 1215.

A SF 400 includes a CDB 501. Each of the CDB 501a and 502b may be an exemplary embodiment of the CDB 501. Each of the SFF 403a and the SFF 401b may be an exemplary embodiment of the SF 400.

The CDB 501 includes a CDB processor 511 and a CDB table 512. An SFC controller 100 is connected to the CDB processor 511 and the CDB gateway 1211. The SFC controller 100 may include an exemplary embodiment of a heterogeneous control/policy point as described in RFC 7665. The CDB processor 511 receives from the SFC controller 100 routing information for forwarding packets from the CDB 501 to the delegator 121. The CDB table 512 stores the routing information. The CDB gateway 1211 receives from the SFC controller 100 routing information for forwarding packets from the delegator 121 to the CDB 501. The CDB table 1213 stores the routing information.

The tenant database 1214 stores records which are associated with a SFP and an SFC enabled domain of the SF 400. The proxy 1212 interacts with the TASF 130. Detailed description of the interaction between the entities in FIG. 2 is given in the With reference to FIGS. 1-3, a first egress packet in the flow 801 is orderly processed by the classifier 200a, the SFF 301a, the SF 401a, the SFF 301a, the SFF 302a, the SF 402a, SFF 302a, the SFF 303a, and SF 403a. As shown in FIG. 1, SF 403a may process the first egress packet according to FIG. 3 as an instance of SF 400 in FIG. 2 and forwards the processed packet to the SFF 303a and the rest of the SFP in the domain 110a. Similarly, as shown in FIG. 1, a second egress packet in the flow 802 is orderly processed by the classifier 200b, the SFF 301b and the SF 401b. SF 401b may process the second egress packet according to FIG. 3 as an instance of SF 400 and forwards the processed packet to the SFF 301b, the SFF 302b, the SF 402b, the SFF 303b, and SF 403b and the rest of the SFP in the domain 110b.

Figure 3:
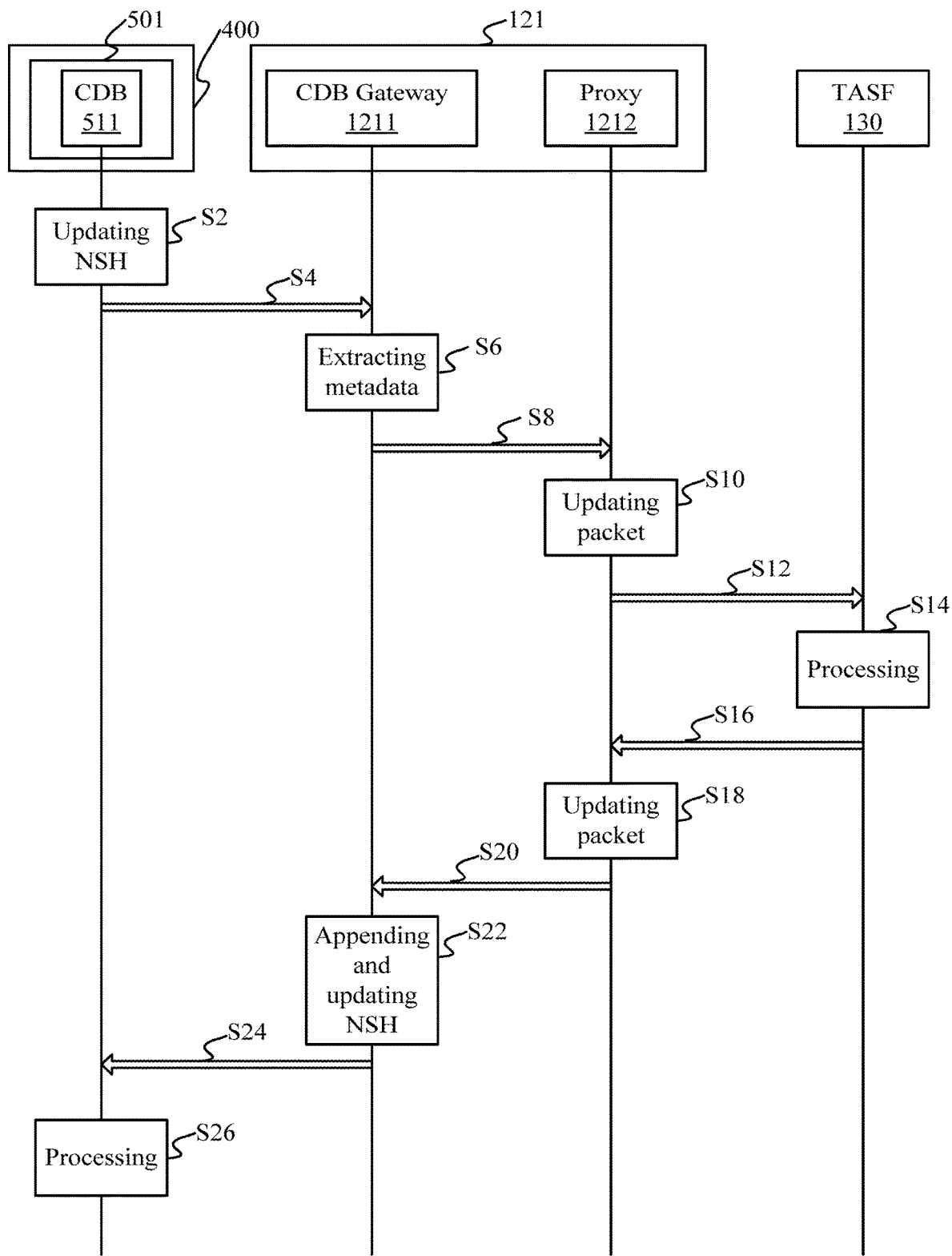
FIG. 3 is a block diagram illustrating a service function chain (SFC) based multi-tenancy processing method.
Figure 4:
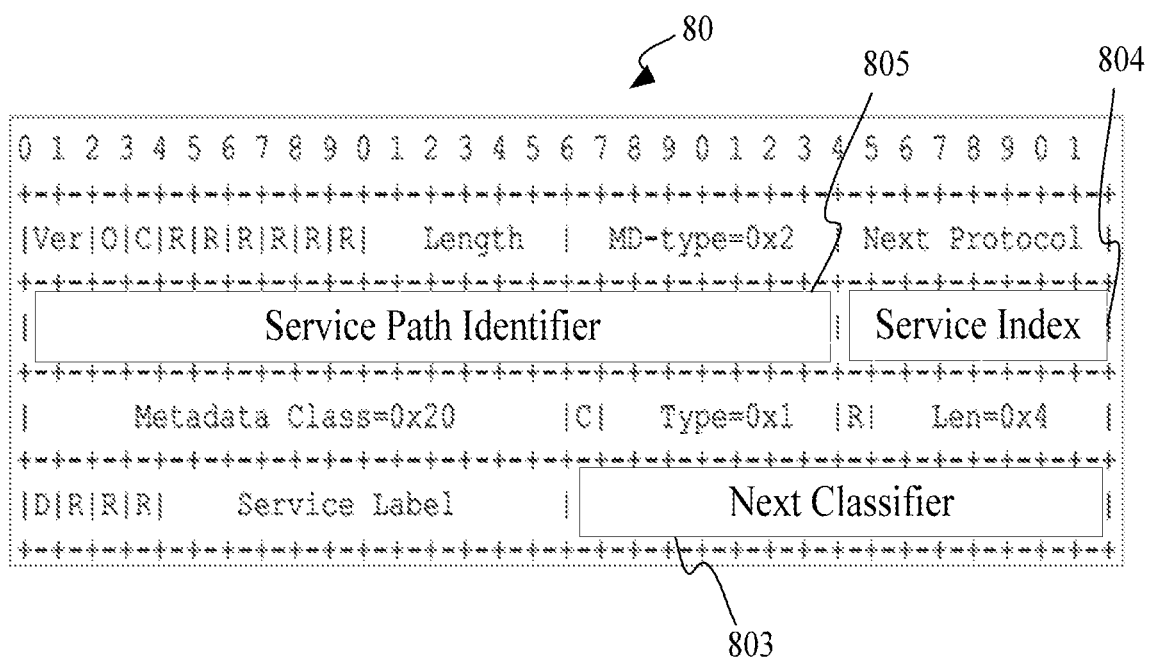
FIG. 4 is a schematic diagram illustrating an SFC packet header.

In FIG. 3, the CDB processor 511 in the CDB 501 of the SF 400 receives a SFC packet, such as the first egress packet or the second egress packet, and updates a network service header (NSH) of the packet with reference to the routing information in the CDB table 512 (step S2) to forward the packet from the CDB processor 511 to the CDB gateway 1211. With reference to FIG. 4, the CDB processor 511 may modify a next classifier field 803 in the NSH of the packet based on the routing information in the CDB 512 to forward the packet from the CDB processor 511 to the CDB gateway 1211. For example, the modified next classifier field 803 represents a classifier identifier of the CDB gateway 1211 which functions as a classifier. The CDB processor 511 forwards the packet from the CDB processor 511 to the CDB gateway 1211 according to the modified next classifier field 803 (step S4).

The CDB gateway 1211 receives and processes the packet to generate a first processed packet (step S6), and sends the first processed packet with the NSH to the proxy 1212 (step S8). In step S6, the CDB gateway 211 receives the packet and extracts metadata in the NSH of the packet, removes NSH of the packet to generate the first processed packet. The proxy 1212 processes the first processed packet utilizing the callback function 1215 to generate a second processed packet (step S10). The callback function 1215 in the step S10 may retrieve and utilize the metadata and records in the tenant database 1214 that is associated with an SFC enabled domain of the SF 400 to process the first processed packet. In an example where the SF 403a serves as an instance of the SF 400, the callback function 1215 in the step S10 may retrieve and utilize the metadata and records in the tenant database 1214 which is associated with an SFC enabled domain 110a of the SF 403a to process the first processed packet. In an example where the SF 401b serves as an instance of the SF 400, the callback function 1215 in the step S10 may retrieve and utilize the metadata and records in the tenant database 1214 which is associated with an SFC enabled domain 110b of the SF 401b to process the first processed packet. The proxy 1212 sends the second processed packet to TASF 130 (step S12).

The TASF 130 executes a service function to process the second processed packet to generate a third processed packet (step S14). The TASF 130 may aggregate information by processing packets from a plurality of SFC enabled domains, such as domains 110a and 110b, and provide the aggregated information for AI related service functions, big data analysis related service functions, or an external service function, such as the external service 140 in FIG. 1.

The TASF 130 receives an ingress packet and sends the ingress packet to the proxy 1212 (step S16). For example, the ingress may be a packet sent from the external service function 140. Alternatively, the ingress may be the third processed packet. For example, the delegator 121a may serve as an instance of the delegator 121, process a first ingress packet according to FIG. 3, and forward the processed first ingress packet to the CDB 501a of the SFP in the domain 110a. Similarly, the delegator 121b may serve as an instance of the delegator 121, process a second ingress packet according to FIG. 3, and forward the processed second ingress packet to the CDB 501b of the SFP in the domain 110b.

The proxy 1212 in the delegator 120 receives and uses the callback function 1215 to process the ingress packet and to generate a fourth processed packet (step S18). The proxy 1212 may update metadata and records associated with the ingress packet in the tenant database 1214 in the step S18. The callback function 1215 in the step S18 may retrieve and update the metadata and records in the tenant database 1214 which is associated with an SFC enabled domain of the SF 400 to process and generate the fourth processed packet. In an example where the SF 403a serves as an instance of the SF 400, the callback function 1215 in the step S18 may retrieve and update the metadata and records in the tenant database 1214 which is associated with the SFC enabled domain 110a of the SF 403a to process the fourth processed packet. In an example where the SF 401b serves as an instance of the SF 400, the callback function 1215 in the step S18 may retrieve and update the metadata and records in the tenant database 1214 which is associated with the SFC enabled domain 110b of the SF 401b to process the fourth processed packet.

The proxy 1212 sends the fourth processed packet with the associated metadata and records to the CDB gateway 1211 (step S20). The CDB gateway 1211 utilizes the metadata and records associated with the fourth packet to encapsulate the fourth processed packet with an NSH to generate a fifth processed packet (step S22). In step S22, the CDB gateway 1211 receives the fourth processed packet, refers to CDB table 1213, and updates the NSH of the fourth processed packet with reference to the routing information in the CDB table 1213 to forward the fifth processed packet from the CDB gateway 1211 to the CDB processor 511.

The CDB gateway 1211 may modify a next classifier field in the NSH of the fourth processed packet based on the routing information in the CDB 512 to forward the packet from the CDB gateway 1211 to the CDB processor 511. For example, the modified next classifier field in the fourth processed packet represents a classifier identifier of the CDB 501 that serves as a classifier.

The CDB gateway 1211 sends the fifth processed packet to the CDB processor 511 in the CDB 501 (step S24). The CDB processor 5011 receives and processes the fifth processed packet to generate a sixth processed packet (step S26). In an example where the SF 403a serves as an instance of the SF 400, the SF 403a forwards the sixth processed packet to the SFF 303a and the rest of the SFP in the domain 110a. In an example where the SF 401b serves as an instance of the SF 400, SF 401b forwards the sixth processed packet to the SFF 301b and the rest of the SFP in the domain 110b.

Figure 5:
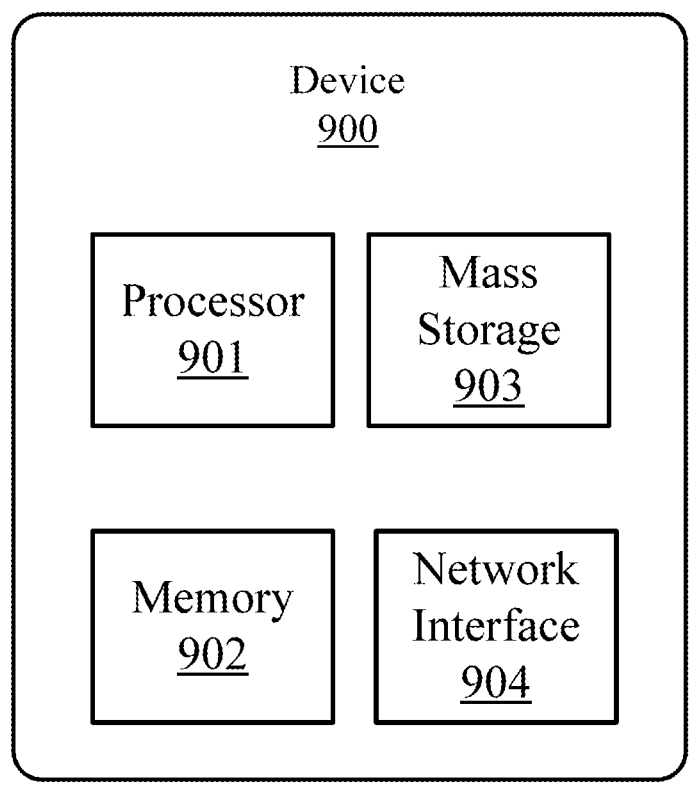
FIG. 5 is a block diagram illustrating an electronic device operable to execute a SFC packet forwarding method of the present disclosure.

With reference to FIG. 5, the method of the present disclosure may be implemented by computer program stored in storage media, such mass storage 903 in a device 900, The computer program implementing the packet forwarding method when loaded to a memory 902 by a processor 901 directs the processor 901 in the device 900 to execute the disclosed method. The processor 901 communicates with other entities through a networking interface 904. Each of the SFC controller, classifiers, SFs, and SFFs in FIG. 1 may implemented as an exemplary embodiment of the device 900. Alternative, all of any combination of the SFC controller, classifiers, SFs, and SFFs in FIG. 1 may simultaneously run in one or more virtual machines in the device 900 or a plurality of exemplary embodiments of the device 900.

The disclosed service function chain (SFC) based multi-tenancy processing method allows isolation between SFC enabled domains, such as domains 110a, 110b, and 110c, while facilitating aggregation of tenant related information from SFC packet flows of various SFPs through CDBs in SFC enabled domains, delegators in a demilitarized zone, and a TASF. The method allows massive data collection across SFCs for massive data processing function, such as big data or AI applications, without breaking isolation between SFCs. The delegators do not directly communicate with each other to maintain delegator isolation and SFC isolation. Each of the delegators connects to a SFC enabled domain, such as a SFP, to the TASF.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A service function chain (SFC) based multi-tenancy processing method, executable by an electronic device, comprising:
   receiving of an egress packet by a tenant-aware service function delegator from an instance of a first service function chain;
   forwarding the egress packet from the tenant-aware service function delegator to a tenant-aware service function;
   forwarding the egress packet from the tenant-aware service function to an external network service function external to the first service function chain;
   receiving an ingress packet from the external network service function by the tenant-aware service function, wherein the ingress packet is sent for the instance of the first service function chain;
   forwarding the ingress packet from the tenant-aware service function to the tenant-aware service function delegator; and
   forwarding the ingress packet from the tenant-aware service function delegator to the instance of the first service function chain.

2. The method of claim 1, further comprising:
   removing SFC encapsulation specific to the first service function chain from the egress packet through the tenant-aware service function delegator.

3. The method of claim 1, further comprising:
   encapsulating the ingress packet through the tenant-aware service function delegator.

4. The method of claim 1, further comprising:
   utilizing a callback function operable to retrieve a record in a tenant database associated with the ingress packet to form SFC encapsulation specific to the first service function chain for encapsulating the ingress packet.

5. The method of claim 4, further comprising:
   forwarding the ingress packet from the tenant-aware service function delegator to a cross domain bridge function of the instance of the first service function chain.

6. The method of claim 1, further, comprising:
   receiving a subsequent egress packet from an instance of a second service function chain by a tenant-aware service function delegator;
   forwarding the subsequent egress packet from the tenant-aware service function delegator to a tenant-aware service function;
   forwarding the subsequent egress packet from the tenant-aware service function to the external network service function external to the second service function chain;
   receiving a subsequent ingress packet from the external network service function by the tenant-aware service function, wherein the subsequent ingress packet is sent for the instance of the second service function chain;
   forwarding the subsequent ingress packet from the tenant-aware service function to the tenant-aware service function delegator; and
   forwarding the subsequent ingress packet from the tenant-aware service function delegator to the instance of the second service function chain.

7. The method of claim 6, further comprising:
   removing SFC encapsulation specific to the second service function chain from the subsequent egress packet through the tenant-aware service function delegator.

8. The method of claim 6, further comprising:
   encapsulating SFC encapsulation specific to the second service function chain upon the subsequent ingress packet through the tenant-aware service function delegator.

9. The method of claim 6, further comprising:
   receiving the subsequent egress packet from a cross domain bridge function of the instance of the second service function chain.

10. The method of claim 9, further comprising:
    forwarding the subsequent ingress packet from the tenant-aware service function delegator to the cross domain bridge function of the instance of the second service function chain.

11. A service function chain (SFC) based multi-tenancy processing method, executable by an electronic device, comprising:
    forwarding an egress packet in an instance of a first service function chain from a service function forwarder to a cross domain bridge function; and
    forwarding the egress packet from the cross domain bridge function to an external network service function through a broker domain connecting the instance of the first service function chain to the external network service function, wherein the external network service function is external to the first service function chain, thereby removing SFC encapsulation specific to the first service function chain from the egress packet through the broker domain.

12. The method of claim 11 further comprising:
    receiving an ingress packet by the cross domain bridge function from the external network service function through the broker domain, thereby encapsulating SFC encapsulation specific to the first service function chain upon the ingress packet through the broker domain.

13. The method of claim 11, wherein the broker domain comprises a service function chain enabled domain.

* * * * *

UNITED STATES PATENT AND TRADEMARK OFFICE
CERTIFICATE OF CORRECTION

PATENT NO. : 10,785,321 B2
APPLICATION NO. : 16/195010
DATED : September 22, 2020
INVENTOR(S) : Kuan-Hung Lin It is certified that error appears in the above-identified patent and that said Letters Patent is hereby corrected as shown below:

On the Title Page

Please replace Item (73) regarding "Assignee" with the following:
(73) Assignee: NANNING FUGUI PRECISION INDUSTRIAL CO., LTD., Nanning (CN)

Signed and Sealed this
Twenty-third Day of May, 2023

Katherine Kelly Vidal
*Director of the United States Patent and Trademark Office*